(12) United States Patent
Mølgaard

(10) Patent No.: US 9,250,710 B2
(45) Date of Patent: Feb. 2, 2016

(54) USER INTERFACE FOR A HAND HELD DEVICE

(76) Inventor: John Mølgaard, Allerød (DK)

(*) Notice: Subject to any disclaimer, the term of this patent is extended or adjusted under 35 U.S.C. 154(b) by 345 days.

(21) Appl. No.: 13/497,534

(22) PCT Filed: Sep. 24, 2010

(86) PCT No.: PCT/EP2010/064145
§ 371 (c)(1),
(2), (4) Date: Jun. 13, 2012

(87) PCT Pub. No.: WO2011/036251
PCT Pub. Date: Mar. 31, 2011

(65) Prior Publication Data
US 2012/0242583 A1    Sep. 27, 2012

(30) Foreign Application Priority Data
Sep. 28, 2009   (DK) .................................. 2009 70132

(51) Int. Cl.
G06F 3/023    (2006.01)
G06F 3/0489   (2013.01)

(52) U.S. Cl.
CPC ............ *G06F 3/0235* (2013.01); *G06F 3/0489* (2013.01)

(58) Field of Classification Search
CPC ......... G06F 19/18; G06F 19/22; G06F 19/24; G06F 12/0822; G06F 12/0831; G06F 19/12; G06F 19/16; G06F 19/20; G06F 19/28; G06F 19/3418; G06F 19/3425; G06F 19/3437; G06F 19/3475; G06F 19/3481; G06F 1/162; G06F 1/1622; G06F 3/04886; G06F 3/0235; G06F 3/0233; G06F 3/0236; G06F 3/0489

USPC .................................................. 345/156–184
See application file for complete search history.

(56) References Cited

U.S. PATENT DOCUMENTS

| 5,515,305 | A  | * | 5/1996  | Register ............... G06F 1/1626 400/486 |
|-----------|----|---|---------|---------------------------------------------|
| 6,198,474 | B1 | * | 3/2001  | Roylance ...................... 345/168      |
| 6,271,835 | B1 | * | 8/2001  | Hoeksma ...................... 345/168       |
| 6,542,091 | B1 | * | 4/2003  | Rasanen ......................... 341/22     |
| 6,681,124 | B2 | * | 1/2004  | Prior et al. ................. 455/575.1     |
| 6,952,173 | B2 | * | 10/2005 | Miller ................... G06F 3/0233 341/22|
| 7,378,991 | B2 | * | 5/2008  | Dietz ................... G06F 1/1626 200/5 A|
| 8,296,676 | B2 | * | 10/2012 | Millington .................... 715/810      |
| 9,158,388 | B2 | * | 10/2015 | Ghassabian ............. G06F 3/014          |
| 2002/0118176 | A1 | * | 8/2002 | Ribak ........................... 345/169    |
| 2002/0175834 | A1 |   | 11/2002| Miller                                        |

(Continued)

FOREIGN PATENT DOCUMENTS

EP    1130502 A1    9/2001
GB    2332293 A     6/1999

(Continued)

*Primary Examiner* — Temesgh Ghebretinsae
*Assistant Examiner* — Michael J Jansen, II
(74) *Attorney, Agent, or Firm* — Volentine & Whitt, PLLC

(57) ABSTRACT

A device with a user interface includes a display screen, input keys, and a controller that is configured to control the display screen to display a three by three matrix of fields wherein each of the fields may contain a symbol, and wherein the controller is further interfaced with a number of the input keys, for example four selection keys or eight selection keys, in such a way that one of the symbols is selected by operation of at least one of these selection keys and some of the symbols are selected by simultaneous operation of two or more of the selection keys.

11 Claims, 17 Drawing Sheets

(a)

(b)

(c)

(56) References Cited

U.S. PATENT DOCUMENTS

| | | | |
|---|---|---|---|
| 2003/0193478 A1* | 10/2003 | Ng et al. | 345/168 |
| 2004/0021696 A1* | 2/2004 | Molgaard | 345/810 |
| 2008/0141125 A1* | 6/2008 | Ghassabian | 715/261 |
| 2008/0174558 A1* | 7/2008 | Lee | 345/168 |
| 2009/0097753 A1* | 4/2009 | Millington | G06F 3/0233 382/187 |
| 2010/0241984 A1* | 9/2010 | Nurmi et al. | 715/773 |
| 2011/0035696 A1* | 2/2011 | Elazari et al. | 715/773 |

FOREIGN PATENT DOCUMENTS

| | | |
|---|---|---|
| WO | 0214996 A2 | 2/2002 |
| WO | 2004063833 A2 | 7/2004 |

* cited by examiner

USER INTERFACE FOR A HAND HELD DEVICE

CROSS REFERENCE TO RELATED APPLICATIONS

This application is the national phase under 35 U.S.C. 371 of PCT International Application No. PCT/EP2010/064145 which has an international filing date of Sep. 24, 2010 and also claims priority under 35 U.S.C. 119 to Danish application PA 2009 70132 filed on Sep. 28, 2009, which applications are hereby incorporated by reference in their entirety for all purposes as if fully set forth herein.

The present invention relates to a user interface with a display screen for displaying symbols in fields that may be selected by a user for input to a device. More specifically, the present invention relates to a graphical user interface allowing a large number of symbols to be selected for input to a device utilising a small number of displayed fields and a small number of user input keys, in particular for use in connection with communication equipment, such as portable phones and computers, e.g. with WAP or SMS interface.

The development of mobile phones and portable phones and computers with an interface operating according to the Wireless Application Protocol (WAP) has increased the need for a user interface allowing a large number of options to be displayed on a small screen for selection, e.g., using a keyboard with a small number of keys.

It is well known to provide portable phones and computers with a small display screen and a small keyboard, e.g., with a navigation key to move a cursor on the display screen, so that a user is able to input data to the equipment and to select functions to be performed by the equipment. A large variety of approaches are known facilitating selection of a large number of alphanumeric characters and functions using a small keyboard together with a small screen.

WO 02/14996 A2 discloses an apparatus with a display screen for the display of graphical symbols in a 3 by 3 matrix arrangement for hierarchical selection of input characters in two or three levels. The user may perform the selection with a keyboard with keys in a corresponding 3 by 3 matrix arrangement, or the display screen may be touch sensitive for selection by tactile means.

Although many attempts have been made to facilitate user selection of an input among a large number of alphanumeric characters and a large variety of functions on a small display screen, there is still a need for a user interface for a hand held device that is convenient and easy to use.

According to the present invention, the above-mentioned and other objects are fulfilled by a device with a human interface comprising a display, input keys, and a controller that is configured to control the display to display a three by three matrix of fields wherein each of the fields may contain a symbol, and wherein the controller is further interfaced with a number of the input keys, for example four selection keys or eight selection keys, in such a way that one of the symbols is selected by operation of at least one of these selection keys and some of the symbols are selected by simultaneous operation of two or more of these selection keys. A key may be operated by depressing, touching, or in any other way manipulating the key.

It has been found that a 3 by 3 matrix arrangement of displayed fields provides a clear display of selectable symbols that is well-suited for the display screen of a hand held device, such as a portable or mobile phone.

The symbol may be a character of any written language, such as one of the characters that can be entered into a computer by a conventional computer keyboard, such as English language written characters, including letters, decimal digits, punctuation marks, and other special characters including control characters, such as ASCII control characters. Other examples of symbols may be Greek characters, Cyrillic characters, Japanese characters, Chinese characters, German characters, Danish characters, etc. The symbol may further be another graphical symbol or sign, such as a mathematical symbol or operator, an icon, etc. Still further, the symbol may be a combination of any of the above-mentioned and other symbols, e.g. the symbol may be a sequence of, or another combination of, alphanumerical characters, e.g. "a-g", "h-n", "o-u", etc.

The human interface makes it possible to enter any symbol which is made available by a conventional computer keyboard. Furthermore, other characters, such as German letters β, ä, ö, and ü, and Danish letters "æ", "ø", "å", "£", space, etc., as well as strings of (control) characters, such as ". (space)", "carriage return, line feed", etc., may be selected on a par with letters and decimal digits. It is well known to adapt the layout of PC keyboards to certain languages. Correspondingly, the layout of the matrices of the present human interface should be adapted to national languages.

The controller may be configured for hierarchical selection of a symbol.

For example, one of the fields of the three by three matrix may contain an index symbol indicating a set of symbols that will be displayed in the fields of the three by three matrix upon selection of the field with the index symbol. The field may for example contain the index symbol "a-g" (displayed without the quotation marks). Upon selection, the alphabetic characters a, b, c, d, e, f, and g will be displayed in the three by three matrix for subsequent individual selection. The remaining two fields of the matrix may be used to display control characters, e.g. so that the user may select to cancel the latest selection, or select "space", by selection of a field with a corresponding symbol. Should more selection possibilities be required the centre field in the middle row could be selected in two ways leading to two different selections as further explained below.

In this way, a user is guided by the human interface during selection of an alphabetic letter or a digit, and selection of a specific alphabetic letter is sufficiently simple to allow the user to memorise the selection procedure. Thus, a user will quickly remember how to select frequently used letters and decimal digits and only once in a while, the trained user will make use of the guidance and assistance provided by the displayed three by three matrices.

The controller may further be configured for hierarchical selection with more than two hierarchical levels in which selection of a field with an index symbol may lead to display of another set of index symbols in the fields of the matrix thereby increasing the number of symbols that can be selected by the user.

The selection keys may have symbols printed on their surface for further assisting the user in memorising the selection procedure. Each selection key may for example have a three by three matrix printed on its surface with empty fields, but with highlighting of the corner field that corresponds to the matrix field selected by depressing the selection key in question.

A first set of four selection keys may be used to select symbols displayed in the three by three matrix. The four selection keys are preferably arranged in a way that facilitates the intuitive perception of the user on how to use the keys in order to perform selection of a desired symbol.

For example, the selection keys may be arranged in a two by two matrix, and the controller may be configured so that operation of a single selection key in the two by two matrix selects the symbol contained in the corresponding corner field of the matrix. Thus, operation of the upper left selection key leads to selection of the symbol contained in the upper left field of the matrix, etc. The controller may further be controlled so that simultaneous operation of two keys leads to selection of the symbol contained in a corresponding field between the fields selected by individual operation of the keys. Thus, simultaneous operation of the upper two selection keys leads to selection of the symbol contained in the centre field of the upper row of the matrix, and simultaneous operation of the leftmost two selection keys leads to selection of the symbol contained in the centre field of the left column of the matrix, and simultaneous operation of the upper left and lower right selection keys leads to selection of the symbol contained in the centre field of the matrix, etc.

In this way, it is easy for the user to figure out which selection keys to operate in order to eventually select a specific symbol. Simultaneously, the human interface is sufficiently simple that a user can memorise the selection procedures for at least the most frequently used symbols.

Preferably, the first set of four selection keys and the display are arranged on opposite sides of the device, the display being located at the front side of the device. The user may then use both hands to hold the device while viewing the display and use two fingers of each hand to operate respective selection keys in the two by two matrix of selection keys.

The human interface may further include a second set of four selection keys and the controller may further be configured to control the second set of four selection keys.

The first set of four selection keys and the second set of four selection keys may be mounted on opposite sides of the device. Preferably, selection keys located at the front side of the device is arranged so that the user may depress two of the keys simultaneously with one thumb and the other two keys simultaneously with the other thumb. If a touch screen is used, then the keys at the front side may be implemented as soft keys, e.g. near the edge of the display.

The first set of four selection keys may be allocated for selection at one level of a hierarchical selection scheme and the second set of four selection keys may be allocated for selection at another level of the hierarchical selection scheme, for example the second level in a two level hierarchical selection scheme facilitating selection of a symbol in a two level hierarchical arrangement in one operation combining depression of one or two keys at the front side of the device with depression of one or two keys at the rear side of the device.

The device may further comprise a sound generator for generation of a specific sound upon corresponding operation of the selection keys to provide audio feedback to the user of the device of the actual selection. The sound generator may be a sound transducer, such as a loud speaker, a piezoelectric transducer, etc. The specific sound may be a specific tone, a sequence of specific tones, a specific chord, a sequence of specific chords, etc., that is associated with actuation of a specific actuator. The present human interface may further incorporate word recognition and speech synthesis so that entered letters, digits, or completed words may be read aloud through the sound generator of the device providing trained users, e.g. trained blind users, with desirable feedback without having to read the display.

The use of index symbols, such as alphabetic characters in alphabetic order, e.g. "a-g", "h-n", etc., provides a clear indication of the options that will be available to the user upon selection of the index symbol in question. Further, this grouping of the letters of the alphabet is similar to the grouping used when children are taught the alphabet in the Western world, for example in the Alphabet song. In this way, very little support from the memory of the user is required for proper operation of the human interface.

The display screen may be any screen that is suitable for displaying alphanumeric characters and other symbols in an arrangement, such as a matrix arrangement. For example, the display screen may be a LCD screen, a LED screen, an OLED screen, a CRT, a plasma screen, a TFT screen, etc., and further the screen may be touch sensitive.

The symbol may be displayed in a distinct field that may be graphically distinguished from its surroundings by means of, e.g., a boundary, a background colour, a background pattern, etc., or any combination of such graphical distinguishing features.

One of the symbols may be a case shifted version of an index symbol contained in the previously selected field before selection. For example, if the selected index symbol is "o-u" (lower case), one of the symbols displayed upon selection may be "O-U" (upper case). Preferably the second index symbol "O-U" is contained in the same field of the matrix as the first index symbol "o-u" for further ease of operation.

The controller may further be configured to display a cursor on the display screen for indication of the field currently selected by the user. The cursor may for example be constituted by changing the background colour of the currently selected field.

At start-up, index symbols may be displayed in the fields of the three by three matrix. Upon selection of one of the index symbols, corresponding new symbols are displayed in the fields of the three by three matrix for selection by the user. One of the symbols may indicate a "cancel" operation. Upon selection of this symbol, the symbols previously displayed in the fields of the three by three matrix will be displayed again. This allows the user to abandon previous selections without inputting data to the device so that the user may for example browse through hierarchical layers of selections and abandon previous selections without inputting data to the device.

It is preferred that upon selection of an individual symbol, the index symbols are displayed in the fields of the three by three matrix. In one example, the start-up image will be displayed upon selection of a symbol for input to the device.

At least one of the fields of the three by three matrix may display the same symbol upon user selection of one of the displayed symbols. For example, during entry of a decimal number, decimal numbers may be displayed in the fields of the three by three matrix until a specific user operation is performed, such as touching a touch sensitive plate or display, simultaneous operation of all four selection keys, etc.

In addition to displaying the three by three matrix, the display of the device may also be used for other purposes. For example, the selected symbols, such as characters, may be appended successively in a string of characters, e.g. constituting a text, that are input to the device, and the string of selected symbols may be displayed on the display together with the three by three matrix, e.g. in a specific area of the display. Alternatively, the string may be displayed in an area of the display also used for display of the three by three matrix. In this case, the string of previously selected symbols is displayed upon selection of a symbol until a specific user operation is performed, such as touching of a touch sensitive plate or display, simultaneous operation of all four selection keys, etc. Upon such operation, the three by three matrix of selectable symbols is displayed again in the display. When a new symbol has been selected, as previously described, the new symbol is appended to the string of previously selected symbols and the updated string is displayed. Thus, the device may use the display, in an alternating manner, to display the string of selected symbols, such as a message currently written by the user, and the three by three matrix, and shift from one display to the other may be performed upon a specific user operation; or, the three by three matrix may automatically be substituted with the previously selected string of symbols after a timeout period. Subsequent depression of any selection key may then display the three by three matrix again. This is very desirable when using small devices, such as mobile phones, portable computers etc., where only a limited amount of space is available for display purposes.

An edit cursor may further be provided within the string of selected characters, and one of the fields of the three by three matrix may display an edit cursor control symbol for controlling the positioning of the edit cursor in the string of selected characters. Preferably, symbols are added or deleted at the position of the edit cursor.

In a device with a touch sensitive plate or a touch sensitive display, the current position of the edit cursor may be controlled by touching the plate or display with a pointing device. A string of previously selected symbols may be marked by touching a corresponding part of the touch sensitive plate or display. The marked string may then be deleted and new symbols entered at the location of the deleted string.

When used to enter text, the present human interface may also utilize predictive text technology for word and/or line completion, i.e. letter entry is combined with a fast-access dictionary of words. Words corresponding to the sequence of key presses are looked up in the dictionary and the resulting words are ordered by frequency of use by the user of the present human interface. The dictionary can be expanded by adding missing words for future recognition. Frequently used combination of words may also be suggested. Selection of possible suggestions may be performed by touching a corresponding area of a touch plate or a touch screen, or by selecting a line number of the alternatives, or in another appropriate way.

A "soft key" could be used to enable or disable automatic word or sentence completion; or, the human interface may include a symbol, the selection of which toggles between enabled or disabled automatic word or sentence completion.

The human interface is well suited for use in communication equipment, such as a hand held device, e.g. with a WAP interface, equipped with a small screen, such as a telephone, such as a mobile phone, a portable phone, etc., a remote controller, e.g. for video or audio equipment, or for other house appliances, a portable computer, a portable electronic calendar, etc.

However, it is also believed that many users will prefer the present user interface over the normal computer keyboard when writing on a computer because of the quick entry of letters and digits and frequently used punctuation marks in combination with the easy-to-learn-and-remember method of the present user interface. Because of the user guidance provided by the display of selectable symbols in three by three matrices in response to selection key entries of the user, it is far easier to learn to use the present human interface than to learn to write on a computer keyboard utilizing blind writing with ten fingers, which is required to obtain similar writing speed with a computer keyboard as with the present human interface. It is an important advantage of the present human interface that during learning or infrequent use, there is no need to move the hands around and search for keys as may often be the case with a conventional computer keyboard.

Four selection keys may be included in a computer keyboard, a mobile telephone keyboard, etc, e.g. by allocating specific appropriate keys of a conventional keyboard to function as respective selection keys, e.g. 4 neighbouring keys in a 2 by 2 matrix of a conventional keyboard may be allocated to function as respective selection keys.

Alternatively, the functions of the four selection keys may be performed by keys included in a computer keyboard, a mobile telephone keyboard, etc, e.g. by mapping the simultaneous depression of selection keys to depression of a single key of the computer keyboard, the mobile telephone keyboard, etc. For example, the twelve keys of a mobile phone, i.e. the keys 0-9 and "*" and "#" may perform the functions of the selections keys as further explained below with reference to FIG. 2.

The human interface may also be advantageously applied in systems with user interfaces incorporating a large display screen or a large keyboard to adapt the system for use by a disabled person who can only operate a small part of the keyboard or use a small part of the display screen, or who needs a crude resolution on the screen due to visual impairment.

For physical handicapped people four big keys could be used. This would allow for writing with partial limbs or with the feet's.

For visual impaired, the displayed matrices may occupy most of the display area of a large screen. The fact that the fingers are always located at the selection keys are of particular advantage to this group of users.

Further, the human interface may be used as a communication means for blind people. Because it is very simple to learn to enter characters by means of a few simple keyboard operations, blind people could easily acquire the necessary skills, and, thus, be able to type quickly with the present human interface. Furthermore, an audio feedback would in this case be very useful since this would provide the user with the possibility of checking whether errors occur during the typing.

For blind people, the regularity of the layout of letters and numbers would make it easier to learn than using Braille writing.

The device with the human interface may be a credit card sized and shaped unit having a display located at its front surface and four selection keys located at its rear surface. The device may further include wireless technology, for example Bluetooth technology, etc, and may operate to substitute a conventional PC keyboard, including multimedia keyboards, game keyboards, etc. The device may further include four selection keys located at the front surface of the device.

The display and the selection keys may be arranged in separate units, e.g. a pen sized and shaped unit having the selection keys, while using the display of a mobile phone. The connection between the Pen and the mobile phone could be established using wireless technology, e.g. Bluetooth.

The present human interface may constitute an application on another device with a display and selection keys, e.g. a Mobile Phone, a PC, a TV using a WEB Browser, GPS navigator, etc.

The present human interface may be used in a car, e.g. by arranging four or eight selection keys on the steering wheel, e.g. for data entry into the navigation system, SMS writing, etc.

The above and other features and advantages of the present invention will become readily apparent to those skilled in the art by the following detailed description of exemplary embodiments thereof with reference to the attached drawings, in which.

The figures are schematic and simplified for clarity, and they may merely show details which are essential to the understanding of the invention, while other details may have been left out.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and sufficient, and will fully convey the concept of the invention to those skilled in the art.

Figure 1:
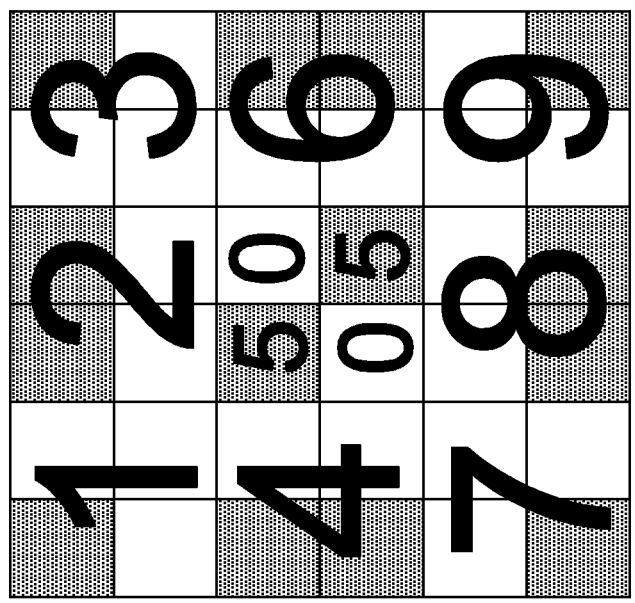
FIG. 1 shows numbering of the fields of the three by three matrix.

FIG. 1 shows the nine fields of a three by three matrix numbered consecutively from left to right and top to bottom with numbers 1-9. The centre field is field number 5; however it may also be used as field number zero. This is further explained below.

In FIG. 1, each field is sub-divided into four sub-fields, wherein each sub-field indicates how the respective field may be selected with the four selection keys of the human interface, wherein the four selection keys are arranged in a two by two matrix. For example, field number one, i.e. the upper left field, may be selected by depressing the upper left key, which is indicated by a gray-shading of the upper left sub-field of field number one. Correspondingly, field number 2 may be selected by simultaneously depressing the upper two keys of the four selection keys, which is indicated by gray-shading the upper sub-fields of field number 2, etc. The centre field may be selected in two ways, namely either by simultaneously depressing the upper left key and the lower right key; or, simultaneously depressing the upper right key and the lower left key. These two possibilities may be utilized to perform different selections relating to the centre field as indicated in FIG. 1 by the numbers 0 and 5, respectively. The sub-fields may be displayed when the three by three matrix is displayed in the display.

Figure 2:
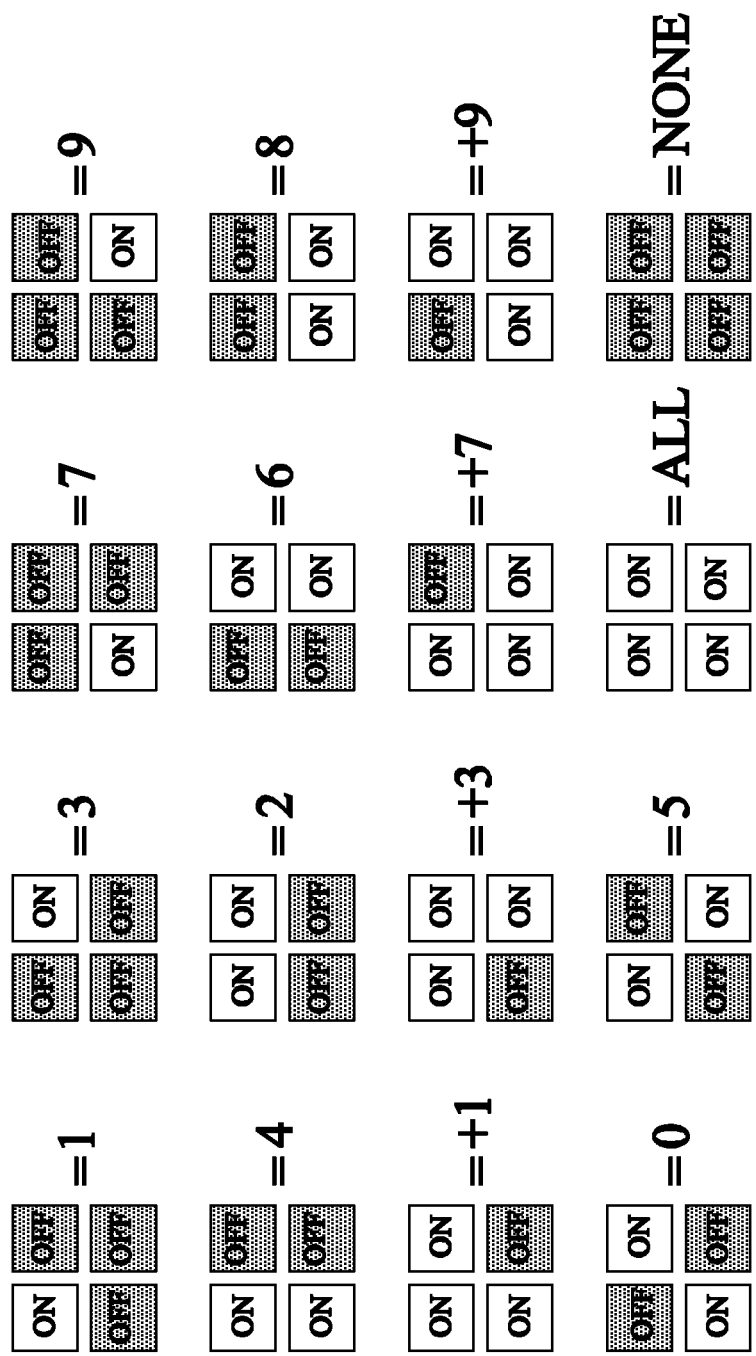
FIG. 2 shows a possible allocation of four selection keys to fields of the three by three matrix.

FIG. 2 shows the four selection keys of the human interface arranged in a two by two matrix. There are sixteen different combinations of pressing or not pressing the four selection keys, and FIG. 2 shows all sixteen combinations. The label "on" indicates that the key is depressed, and the label "off" indicates that the key is not depressed. Each of the combinations of key depressions shown in the upper two rows of FIG. 2 may be used for selection of the field with the field number indicated after the "=" sign as explained with relation to FIG. 1. The two leftmost combinations shown in the lowest row of FIG. 2 may be used for selection of the centre field, either for the same selection or for two different selections as will be further explained below. The combinations "+1", "+3", "+7", "+9", "ALL", and "NONE" will also be further explained below.

When a certain combination of keys is depressed, the corresponding field may be indicated by a cursor, for example the corresponding field may be highlighted in various ways, such as displaying the field with a different colour than the other fields of the three by three matrix, displaying the field with a different frame than the other fields, displaying the field with the symbol in a different colour than the symbols displayed in the other fields, displaying the field with the symbol in another style than the symbols displayed in the other fields, etc., or any combination of any of these ways of highlighting a field.

Selection of a specific field may be performed upon release of all currently depressed selection keys; or, selection of a specific field may be performed upon release of all currently depressed selection keys when the lowest hierarchical level of the human interface has been reached, selections at the higher hierarchical levels being performed by depressing and releasing keys in the desired specific combination, or in another suitable way.

For example, in a two-level hierarchical system, the first selection at the first (top) hierarchical level may be performed by pressing the required one key if a corner field is to be selected; or the required combination of two keys if a field between corner fields is to be selected, and subsequently releasing all of the depressed keys. Subsequently, a specific symbol is selected at the second hierarchical level by, again, pressing the required one or two selection keys for selection of the desired matrix field, and subsequently releasing all of the depressed keys.

In another example, in a two-level hierarchical system, the first selection at the first (top) hierarchical level may be performed by pressing the required one key if a corner field is to be selected; or the required combination of two keys if a field between corner fields or the centre field is to be selected. After a predetermined time period, the symbols of the second hierarchical level corresponding to the selection are displayed in the fields of the matrix. Subsequently, a specific symbol is selected at the second hierarchical level by, as in the previous example, pressing the required one or two selection keys for selection of the desired matrix field, and subsequently releasing all of the depressed keys. In this example, the predetermined time period will be a limiting factor for the maximum typing speed that can be obtained. A trained user will be able to work comfortably with a short predetermined time period. The user may be allowed to set the predetermined time period.

As already mentioned, the human interface may include a first set of four selection keys and a second set of four selection keys, and the first and second set of selection keys may be mounted on opposite sides of the device. Preferably, selection keys located at the front side of the device is arranged so that the user may depress two of the keys simultaneously with one thumb and the other two keys simultaneously with the other thumb. In a two-level hierarchical selection scheme, the first set of four selection keys may be associated with selection at one level of the hierarchical selection scheme and the second set of four selection keys may be associated with selection at the other level of the hierarchical selection scheme so that selection of a symbol in the two level hierarchical arrangement can be done in one operation combining depression of one or two keys at the front side of the device with depression of one or two keys at the rear side of the device.

In this way, the above described sequential selection of hierarchical levels is replaced with a spatial selection of hierarchical levels, and the above mentioned predetermined time period is not required. This provides the fastest possible selection of a symbol, while still providing the same feedback to help in the selection process as explained above for only one set of selection keys. Furthermore, selection may still be performed by simultaneous release of all keys, and browsing for a specific character can be performed by sequentially pressing one or more keys of the set of four selection keys associated with the first hierarchical level.

In an embodiment with two sets of selection keys, selection may instead be performed by simultaneous release of all keys of the set of selection keys associated with the first hierarchical level disregarding the state of the selection keys of the other set. Thus, with the grouping of letters and digits of the symbol hierarchy shown in FIGS. 8-19, for selection of a letter this would mean that the notion of simultaneous release disappears, since only one key of the first set of four selection keys is pressed (associated with the first hierarchical level). As a consequence of this, the repeated selection of a letter can be done by pressing and releasing the same key in the selection key set associated with the first hierarchical level.

Figure 5:
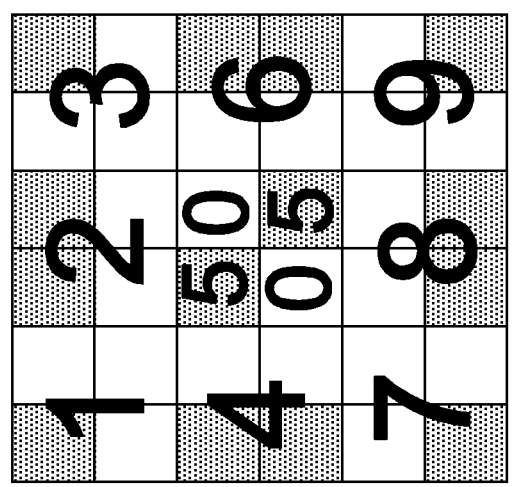
FIG. 5 shows en example on how numerical digits might be displayed in the fields of the three by three matrix

Further, only pressing keys of the set associated with the second hierarchical level can also be considered, for example for selection of numbers 0-9 using the layout of FIG. 5, as further explained below.

Throughout the present disclosure, the term "simultaneous" means that something happens with a certain timing, namely within a short time period, related to the operation of device, and is experienced by the user to happen simultaneously. For example, the timing of pressing and releasing keys simultaneously is associated with the scanning of the keyboard of the device, including the set of four selection keys. Typically, the keys of a keyboard are scanned periodically, e.g. 30 to 100 times per second. Preferably, states of keys, i.e. pressed or not pressed, that do not last for two or more consecutive scanning periods are ignored. Keys are simultaneously released when all the keys in question are no longer pressed for two or more consecutive scanning periods. Likewise, keys are simultaneously pressed when all the keys in question have been pressed for two or more consecutive scanning periods.

Thus, when a symbol is selected by simultaneous release of two or more keys, the symbol selected is the symbol that has been selected for one or more scanning periods immediately before detection of the release.

Figure 3:
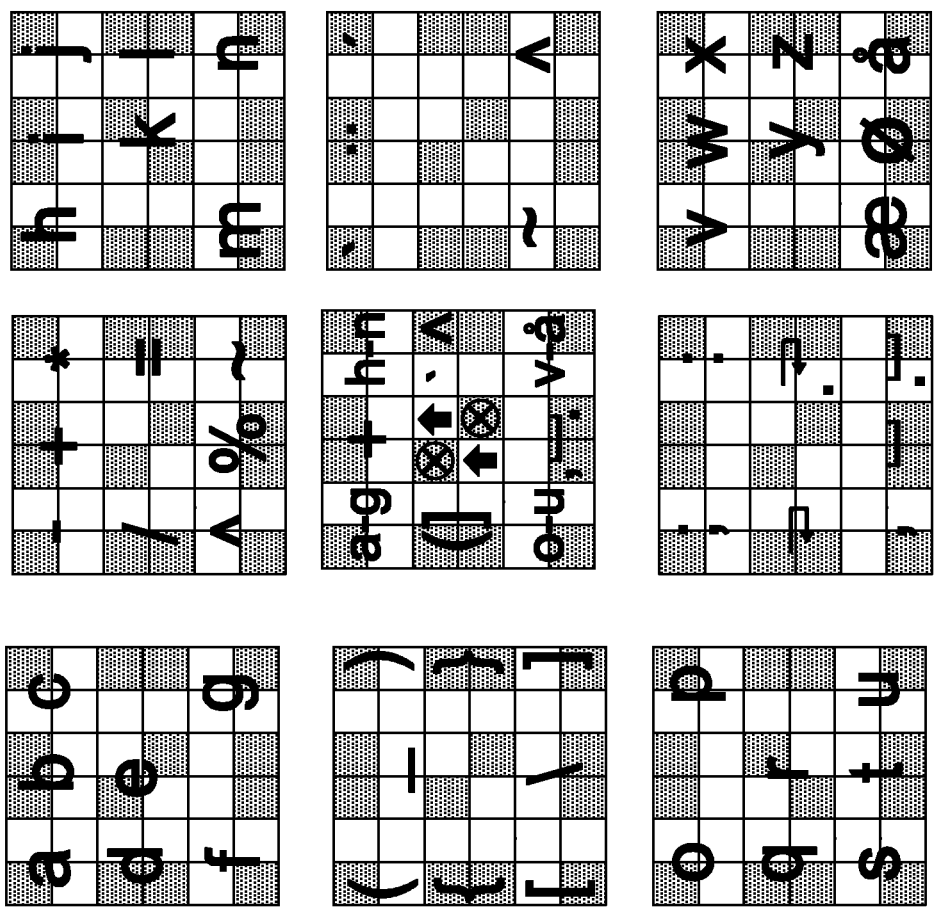
FIG. 3 shows examples of symbols displayed in the fields of the three by three matrix.

FIG. 3 illustrates an exemplary two level hierarchy of symbols, namely symbols typically found on a western computer keyboard. The nine matrices are shown together for illustration and explanation purposes only. In the display of the device, only a single matrix is displayed at the time. The indications of the subfields are not necessarily shown in the display, but are shown in the figures for illustration purposes only.

The centre matrix contains the index symbols shown in the display of the device at start-up. The corner fields of the centre matrix contain index symbols of alphabetic characters of western languages. Further, the lower right field of the centre matrix contains an index symbol of the Danish alphabet. It should be noted that control characters are displayed in the centre field for selection. For example, selection of field zero, i.e. simultaneous depression of the upper right key and the lower left key, case shifts the alphabetic letters, and the centre matrix of FIG. 4 will be displayed for selection of upper case letters, and wherein selection of field zero leads to a shift back to lower case letters and the centre matrix of FIG. 3 will be displayed again. Further, selection of field five, i.e. simultaneous depression of the upper left key and the lower right key, deletes a previously selected symbol, for example the immediately previously selected symbol; or, the previously selected symbol at the current position of an edit cursor.

Selection of the upper left field of the centre matrix with index symbol a-g changes the content of the displayed three by three matrix into the upper left matrix of FIG. 3 allowing the user to select one of the letters a, b, c, d, e, f, or g in the way already explained with reference to FIGS. 1 and 2. Likewise, selection of the upper centre field with index symbol + changes the content of the displayed three by three matrix into the upper centre matrix of FIG. 3 the punctuation marks -, +, *, /, =, ˆ, %, or ~. Thus, in FIGS. 3 and 4, selection of a field in the centre matrix leads to display of the three by three matrix with the same relative position in FIGS. 3 and 4, respectively. Upon selection of one of the fields of the matrices shown surrounding the centre matrix, the centre matrix is displayed again. The user may select not to enter any of the displayed symbols of the surrounding matrices by selecting one of the respective empty fields. For further guidance of the user, one of the empty fields may be used to display a symbol indicating cancellation of selection. Since one of the most frequently used characters is "space", one of the empty fields may be used for selection of "space". Further, selection of "space" may be performed without changing the displayed fields of the matrix facilitating selection of multiple "space"s without leaving the second level of the hierarchy.

The lower middle matrix shows examples of strings of symbols that may be selected, such as period/full stop and carriage return line-feed, and period/full stop and space. Further, period/full stop and space might also invoke a shift to upper case for the subsequent letter.

Selections may be made upon release of the selection keys in which case the user is allowed to browse through and examine possible selections by depressing keys in various combinations without simultaneously releasing all keys before deciding on a specific selection that is then performed by simultaneous release of all currently depressed selection keys. The matrix shown in FIG. 5 is displayed by depressing and releasing all four selection keys. The decimal numbers shown in the matrix is selected by depressing a corresponding combination of four selection keys as explained above. The display does not change after a numerical digit is selected, this allows for writing numbers efficiently.

Figure 6:
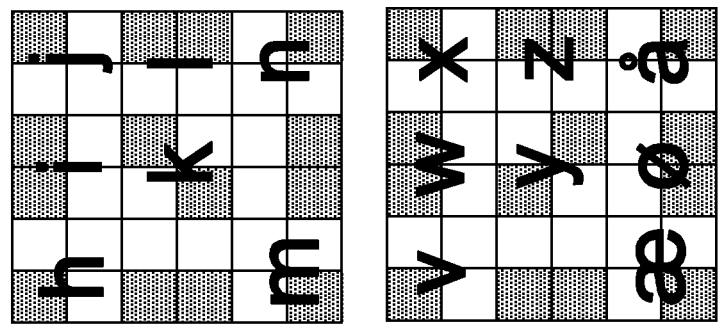
FIG. 6 shows the four matrices of the lower case alphabet selectable using "shortcuts"
Figure 6:
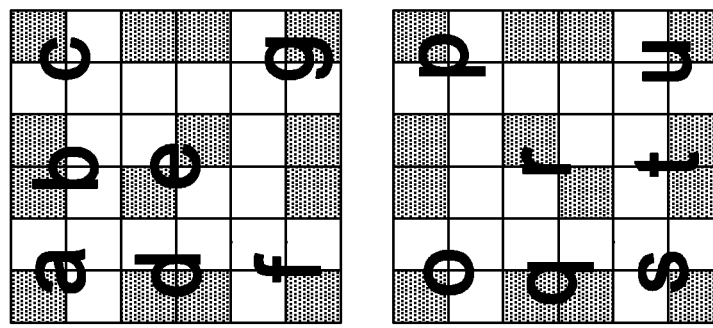

The four matrices of FIG. 6 are shown together for illustration and explanation purposes only. In the display of the device, only a single matrix is displayed at the time. The indications of the subfields are also not shown in the display, but are shown in the figures for illustration purposes only. Each of the four matrices shown in FIG. 6 is displayed by depressing a corresponding combination of three keys, acting as a shortcut, namely the combination +1 shown in FIG. 2 (row 3) leads to the display of the upper left matrix of FIG. 6, and correspondingly, the combination +3 shown in FIG. 2 (row 3) leads to the display of the upper right matrix of FIG. 6, the combination +7 shown in FIG. 2 (row 3) leads to the display of the lower left matrix of FIG. 6, and the combination +9 shown in FIG. 2 (row 3) leads to the display of the lower right matrix of FIG. 6, for subsequent individual selection of the alphabetic letters as explained above.

Figure 4:
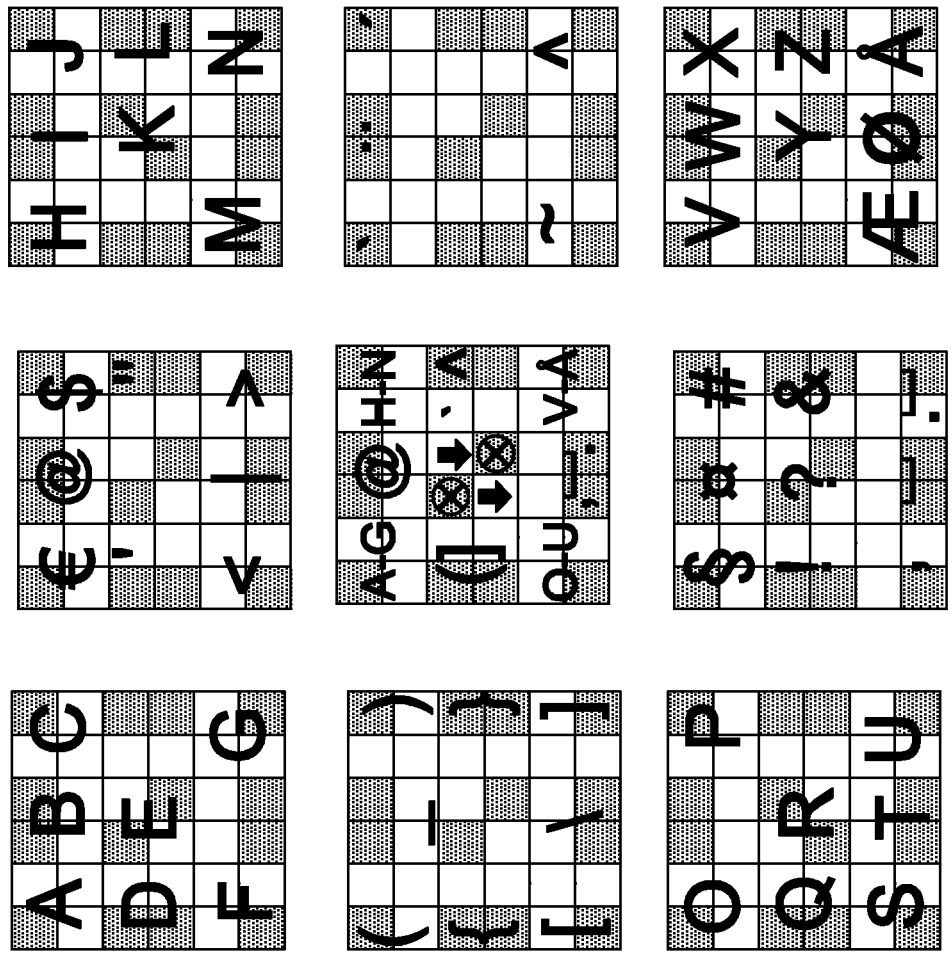
FIG. 4 shows further examples of symbols displayed in the fields of the three by three matrix.
Figure 7:
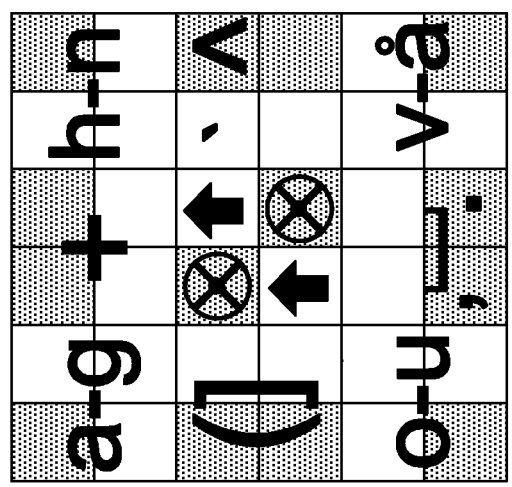
FIG. 7 shows the "initial" three by three matrix, also reachable from the numerical digits matrix.

In this embodiment, depressing all four selection keys leads to the display of the matrix shown in FIG. 7 for subsequent selection of characters in a two level hierarchy as already explained with reference to FIGS. 3 and 4. A repeated depression of all four selection keys leads to the display of the matrix shown in FIG. 5 again. Thus, depressing all four selection keys alternatingly leads to the display of the matrices with decimal digits shown in FIG. 5 and index symbols shown in FIG. 7, respectively.

FIGS. 8-19 illustrate yet another example of the present human interface with a different symbol hierarchy for selection with four selection keys. Each selection may be performed as explained above. However, in the following another possible selection scheme will be explained.

Each of FIGS. 8-19 shows a three by three matrix shown in the display of the device with a cursor positioned in a selected field of the displayed matrix. Below the matrix, the four selection keys are shown in a two by two matrix arrangement wherein currently depressed selection keys are also indicated. To the right of the matrix, the selected symbol is shown.

FIG. 8c shows the matrix of index symbols displayed at start-up. Depressing the upper left selection key, as shown in FIG. 8a, leads to selection of the upper leftmost field of the index matrix containing index symbol 1a and thus, display of the three by three matrix shown in FIGS. 8a and 8b. Release of all selection keys at this point would lead to selection of the digit "1". However, instead, FIG. 8b illustrates selection of the letter "a" by continued depression of the upper left selection key and additional depression of the upper right selection key and subsequent release of all selection keys. As indicated in FIG. 8c, the letter "a" is selected and the matrix of index symbols is displayed again so that the human interface is ready for the next selection. Thus, selection of a field of the matrix with index symbols is performed by depression of corresponding selection keys while selection of a field of one of the other matrices is performed by release of all selection keys.

Figure 8:
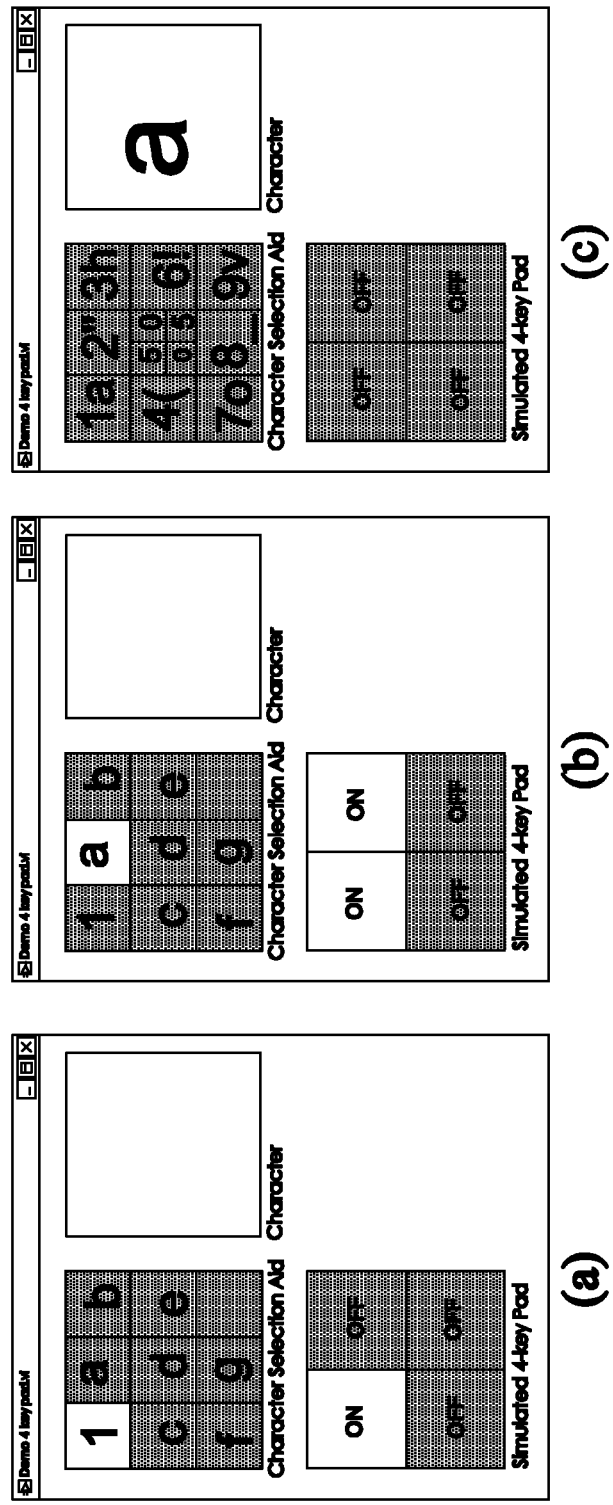
FIGS. 8-19 illustrate another example the present human interface.
Figure 9:
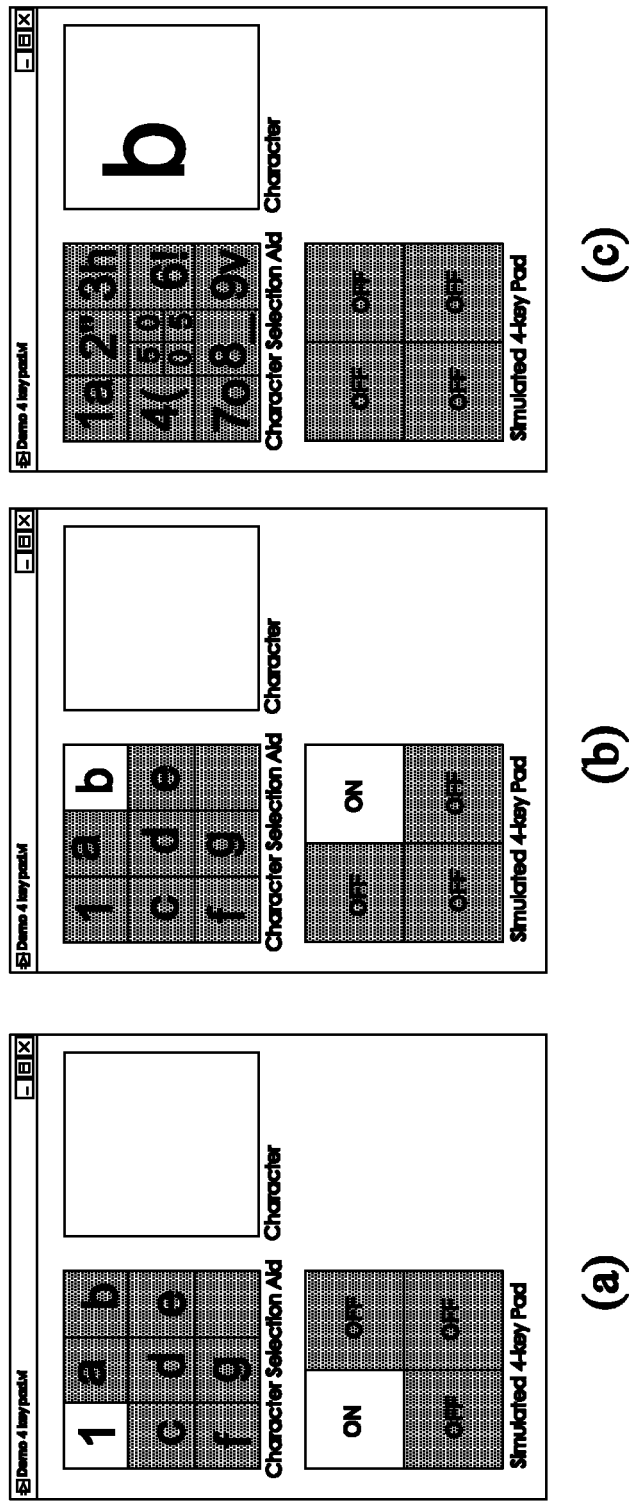

FIG. 9 illustrates selection of the letter "b". The selection is performed by depressing the upper left key as indicated in FIG. 8a, then additionally also depressing the upper right key, then releasing the upper left key, and finally releasing the upper right key.

In this way, symbols displayed in the field with the same relative position in the displayed matrix as the corresponding index symbol in the index symbol matrix can be selected with a single depression action followed by release of all the depressed keys as explained above for the selection of digit "1". Thus, with the grouping of letters and digits of the symbol hierarchy shown in FIGS. 8-19, all the digits 0-9 may be selected with a single key depression action, i.e. depression of the required key(s) is followed by release of all the depressed keys, and thus, the selection is performed without requiring depression of an additional key as is required, e.g. for the selection of the character "a" as illustrated in FIG. 8, and without requiring release of one key before another key as is required, e.g. for the selection of the character "b" as explained above.

Figure 10:
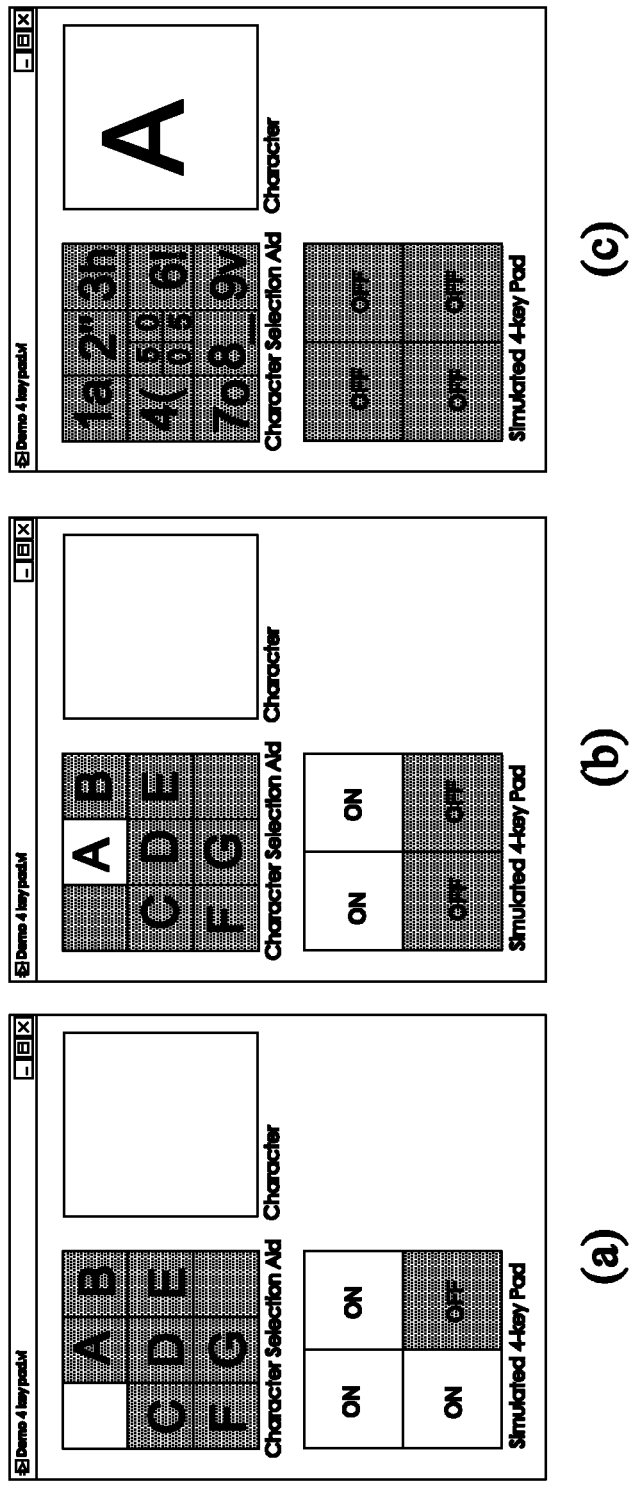

FIG. 10 illustrates selection of upper case letters. Simultaneous depression of the upper left, upper right, and lower left keys selects the upper left field of the index matrix leads to display of the matrix of FIGS. 10a and 10b containing capital letters A-G, wherein each capital letter is displayed in the same field as the corresponding lower case letter. Subsequent selection of one of the capital letters is performed in the same way as explained above with reference to FIGS. 8 and 9. For example, capital letter "A" is selected by releasing the lower left key and subsequently releasing all keys as indicated in FIG. 10.

Figure 11:
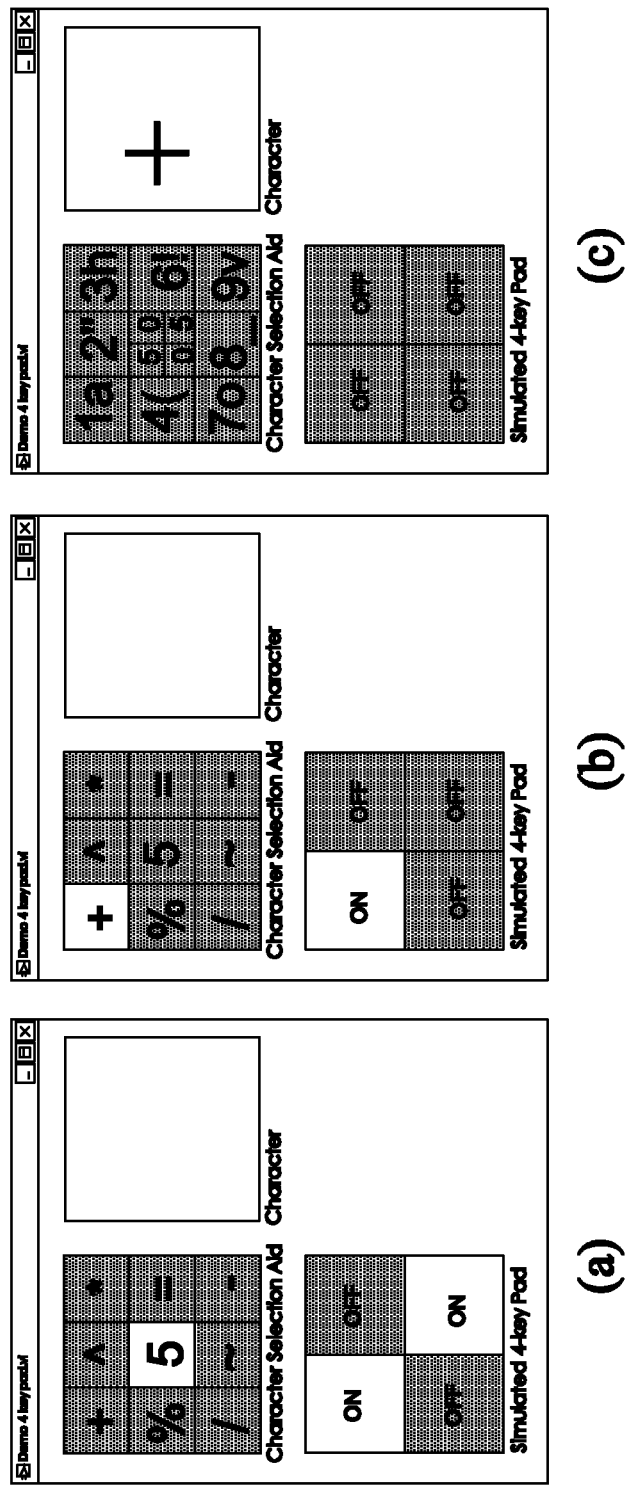

FIG. 11 illustrates selection of the symbol or character "+". When the index matrix is displayed, the matrix of FIG. 11a will be displayed in response to the simultaneous depression of the upper left key and the lower right key constituting one of two possible selections of the centre field of the index matrix. Subsequent release of these two selection keys would lead to selection of the digit "5". However, as illustrated in FIG. 11b, the character "+" is selected by releasing the lower right key while keeping the upper left key depressed and subsequently releasing the upper left key.

Figure 12:
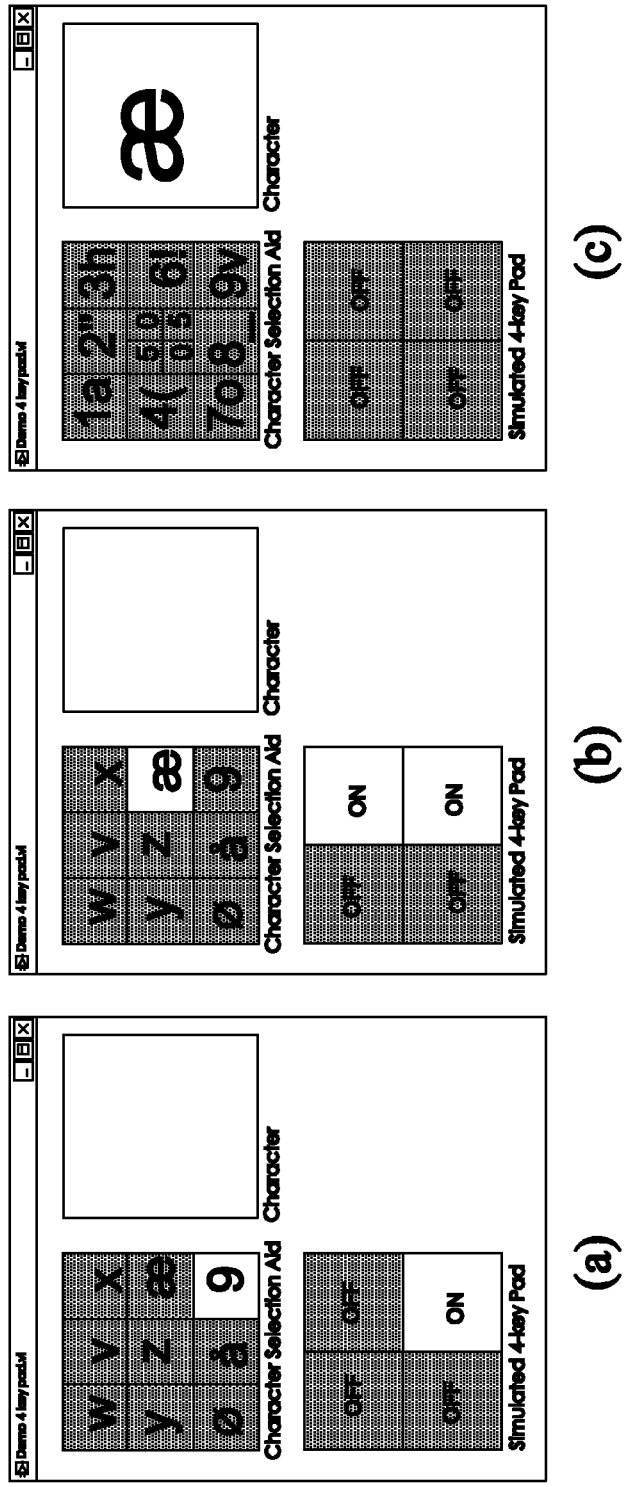

FIG. 12 illustrates selection of the Danish letter "æ". When the index matrix is displayed, the matrix of FIG. 12a will be displayed in response to depression of the lower right key. Subsequent release of the lower right key would lead to selection of the digit "9". However, as illustrated in FIG. 12b, the character "æ" is selected by depressing the upper right key while keeping the lower right key depressed and subsequently releasing both keys.

Figure 13:
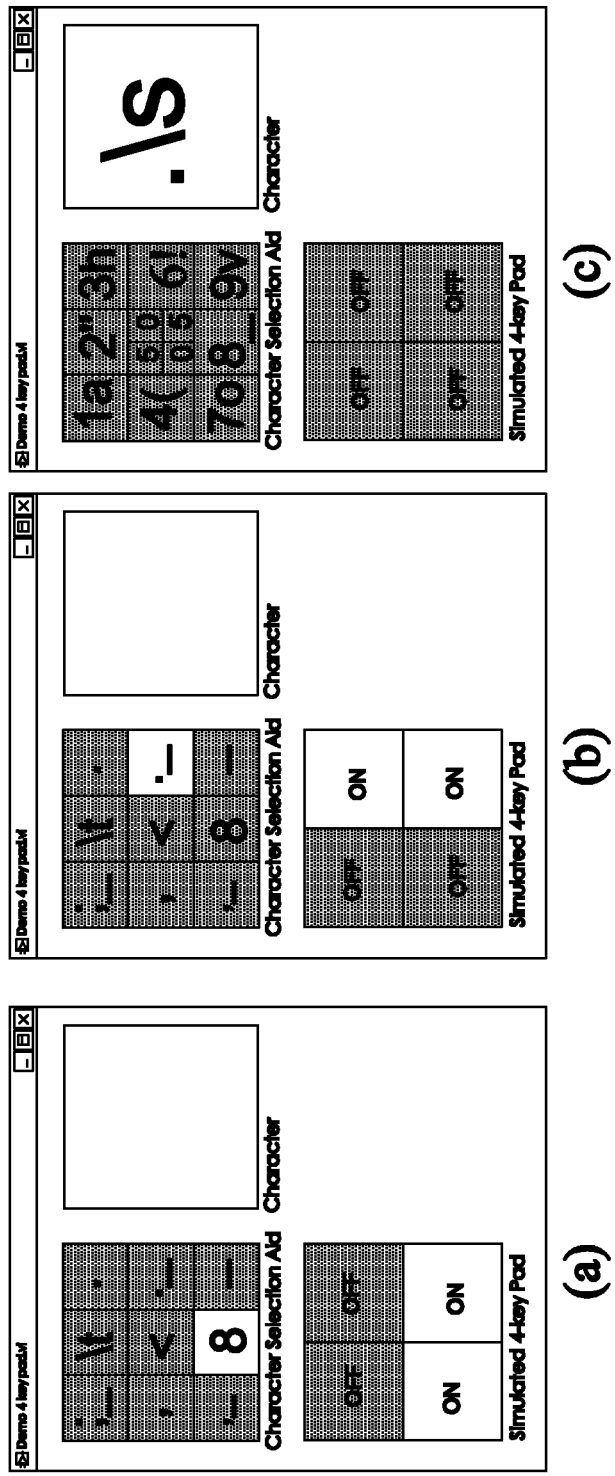

FIG. 13 illustrates selection of the string period/full stop followed by a space character. When the index matrix is displayed, the matrix of FIG. 13a will be displayed in response to the simultaneous depression of the lower left key and the lower right key. Subsequent release of these two selection keys would lead to selection of the digit "8". However, as illustrated in FIG. 13b, the string "." is selected by releasing the lower left key while keeping the lower right key depressed and subsequently depressing the upper right key together with the lower right key and finally releasing both keys.

Figure 14:
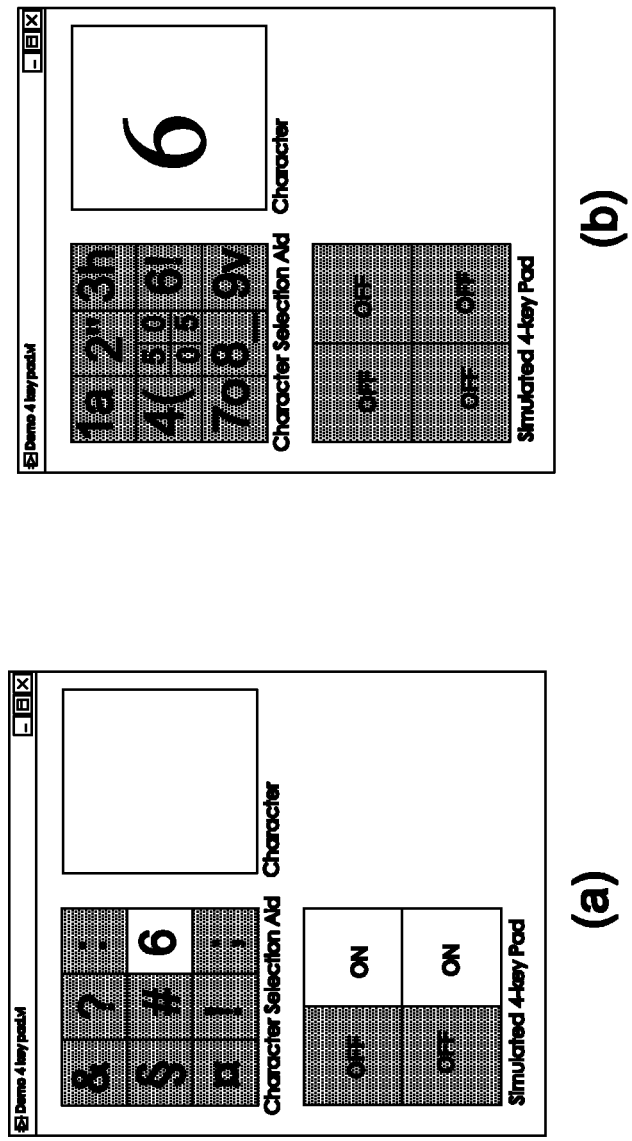

FIG. 14 illustrates selection of the digit "6". When the index matrix is displayed, the matrix of FIG. 14a will be displayed in response to the simultaneous depression of the upper right key and the lower right key. Subsequent release of these two selection keys leads to selection of the digit "6".

Figure 15:
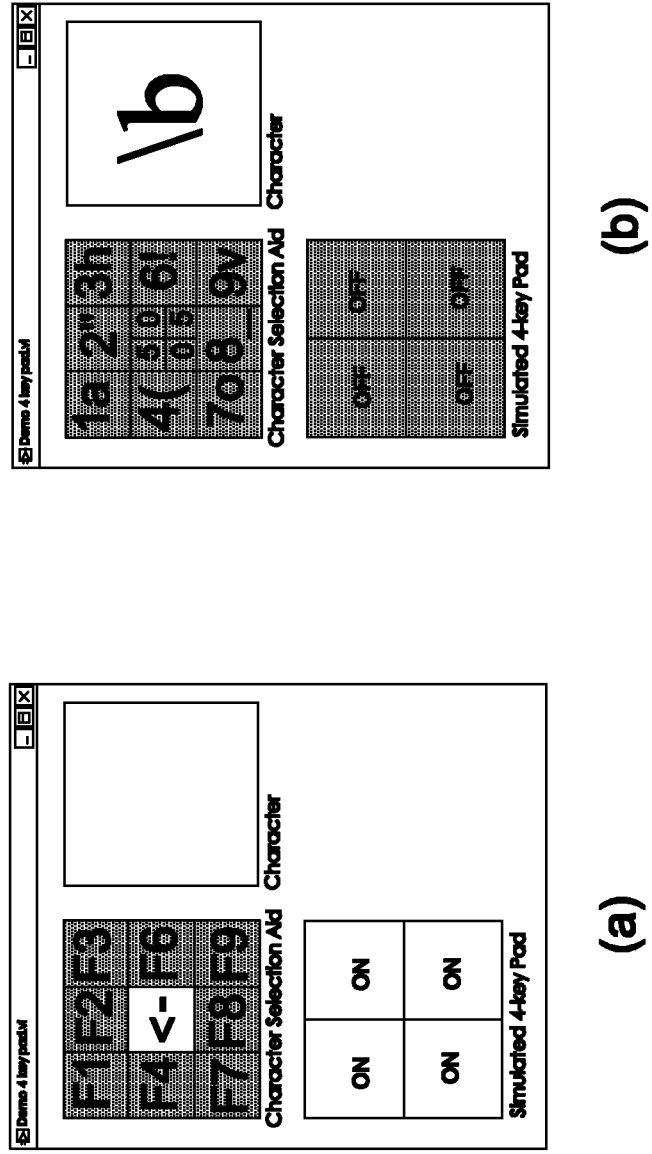

FIG. 15 illustrates selection of the backspace control character. When the index matrix is displayed, the matrix shown in FIG. 15a will be displayed in response to the simultaneous depression of all four selection keys. Subsequent release of all four selection keys leads to selection of the backspace control character as indicated in FIG. 15b. The control character may be used to move an edit cursor one symbol backwards in a string of previously selected symbols, such as letters and digits. The remaining fields of the matrix of FIG. 15a contain the function keys F1 to F8, respectively, for selection in the same way as other symbols. Selection of a specific function key results in execution of a corresponding function of the device, e.g. the same response as selection of the corresponding function key on a computer keyboard. In another example, the function keys are substituted with mode switches. The function of a mode switch is to exchange the symbols of one, more, or all of the matrices shown in the figures with other symbols, for example symbols of the Greek alphabet, or mathematical formula layouts, cursor menus, or other graphical signs or icons. Icons may be used to launch other programs. For example simultaneous depression of all four selection keys may mode switch back to the original matrices displayed on start-up and before selection of a mode switch. In a Mobile Phone, utilizing the present human interface, the four selection keys may also be used to select different phone applications, e.g. as menu navigation keys.

Figure 16:
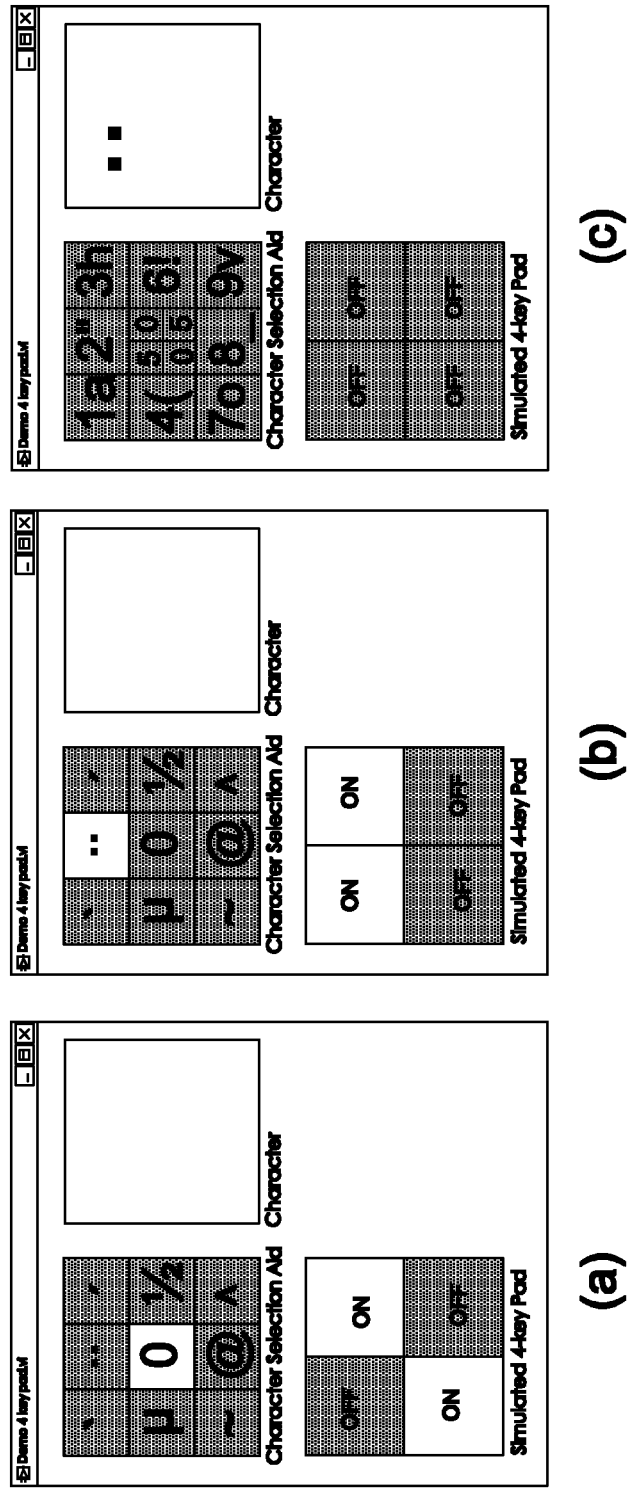

FIG. 16 illustrates selection of the "¨" character to be combined with a letter as for example in the German "umlaut" ä. When the index matrix is displayed, the matrix of FIG. 16a will be displayed in response to the simultaneous depression of the upper right key and the lower left key constituting one of two possible selections of the centre field of the index matrix. Subsequent release of these two selection keys would lead to selection of the digit "0". However, as illustrated in FIG. 16b, the symbol umlaut "¨" is selected by releasing the lower left key while keeping the upper right key depressed and subsequently depressing the upper left key together with the upper right key and finally releasing both keys. The symbol "¨" is then combined with a subsequently, or the previously, selected letter, e.g. "a", to form a combined letter, e.g. "ä". Other diacritics or diacritical marks may also be selected, such as the acute accent " ´ " shown in the upper right field of the matrix of FIG. 16a, the grave accent "`" shown in the upper left field of the matrix of FIG. 16a, the tilde "~" shown in the lower left field of the matrix of FIG. 16a, and the circumflex accent "^" shown in the lower right field of the matrix of FIG.

16a. Diacritical marks may appear above or below a letter; or in another position, such as within the letter or between two letters depending on the language in question.

The human interface may group letters, digits, and diacritics in a hierarchy with more than two levels whereby inclusion of many different diacritics is made possible.

Frequently used accents or other diacritics may be allocated to the second hierarchical layer for easy selection by the user, or preferably combined with the relevant letter.

In a language with many diacritic marks, a 3-level scheme may be useful with infrequently used diacritic marks positioned in the third level. For related diacritic marks, the most common mark may be found in level two and repeated at the same position in the three by three matrix in level 3 leading to a two level selection for the most common diacritic mark with related marks in the third level.

The human interface may check whether the selected combination of letter and diacritics is allowed in the language currently used and may automatically prevent entry of an unallowable combination, and may suggest allowable combinations for user selection, and may perform automatic correction when possible.

Figures 17, 18, 19:
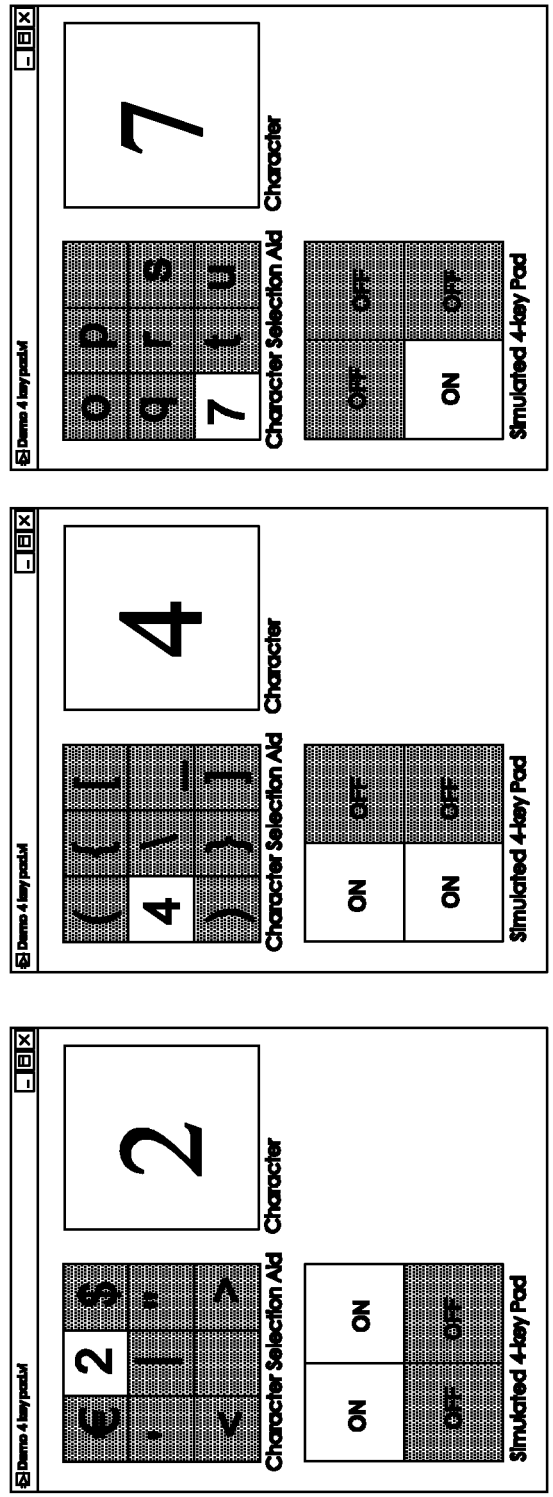

FIGS. 17, 18, and 19 illustrate the remaining matrices that can be displayed and also illustrate selection of the digits 2, 4, and 7, respectively, with a single key depression action as already explained above.

FIG. 18 shows the matrix with parenthesis, backslash and underscore displayed in the fields. Selection of the underscore symbol results in underscoring of subsequently selected symbols until the underscore symbol is selected again. During underscoring, the matrices may be displayed with underscored symbols in their fields. If a string of previously selected symbols is marked, the marked string will be underscored upon selection of the underscore symbol. In another example, selection of the underscore symbol leads to underscoring of the first subsequently selected symbol while the next symbol will not be underscored, unless the underscore symbol has been selected again.

The illustrated examples do not show the modifier keys "Ctrl" and "Alt" as well as the "Cursor menu keys"; but they could be included if required.

The number of selectable symbols may easily be increased by arranging the selectable symbols hierarchically in a hierarchy with more than two levels. The more levels in the hierarchy of symbols, the longer the sequence of selection key depressions will be before the desired symbol can be selected.

Many other embodiments are possible. For example, the matrix of index symbols may show the symbols well-known from telephone key pads, namely the decimal numbers in combination with letters, and the second hierarchical matrices may be formed accordingly.

In one embodiment, the four selection keys may be included in a computer keyboard, a mobile telephone keyboard, etc., e.g. by allocating specific appropriate keys of a conventional keyboard to function as respective selection keys, e.g. 4 neighbouring keys in a 2 by 2 matrix of a conventional keyboard may be allocated to function as respective selection keys.

In another embodiment, the functions of the four selection keys may be performed by keys included in a computer keyboard, a mobile telephone keyboard, etc, e.g. by mapping the simultaneous depressing selection keys to depressing a single key of the computer keyboard, or sequential depressing multiple keys one at the time of the mobile telephone keyboard, etc. For example, the twelve keys of a mobile phone, i.e. the keys 0-9 and "*" and "#" may perform the functions of the selections keys as further explained below with reference to FIGS. 1 and 2.

As shown FIG. 2, the four selection keys can be depressed in 16 different combinations including the combination of depressing no keys.

In a mobile phone, the nine numerical keys 1-9 is located in a 3 by 3 matrix and the functions of the four selection keys may be mapped so that depressing key "1" of the mobile phone selects field number 1 of the three by three matrix as illustrated in FIG. 1. Likewise, depressing key "2" of the mobile phone selects field number 2 of the three by three matrix as illustrated in FIG. 1, etc. Depressing "0" selects the centre field as explained previously. A function corresponding to simultaneously depressing 3 selection keys may be performed by sequentially depressing "#" and one of numerical keys "1", "3", "5", or "7" as also indicated in FIG. 2. Depressing "*" may be used to perform the function of depressing all of the four selection keys simultaneously.

The invention claimed is:

1. A device with a human interface comprising a display, input keys, and a controller that is configured to control
   the display to display a three by three matrix of fields wherein each of the fields contains a symbol, and wherein the controller is further interfaced with
   a first set of four selection keys of the input keys in such a way that one of the symbols is selected by operation of at least one of the first set of four selection keys and some of the symbols are selected by simultaneous operation of two of the first set of four selection keys,
   wherein the display and the first set of four selection keys are positioned on opposite sides of the device, wherein the display is located on a front side of the device, and wherein the first set of four selection keys are located on a rear side of the device,
   wherein the controller is further configured to control a second set of four selection keys of the input keys, and wherein the first set of four selection keys and the second set of four selection keys are mounted on opposite sides of the device, and
   wherein the first set of four selection keys is allocated for selection at one level of a hierarchical selection scheme and the second set of four selection keys is allocated for selection at another level of the hierarchical selection scheme.

2. A device according to claim 1, wherein the first set of four selection keys are arranged in a two by two matrix.

3. A device according to claim 2, wherein the controller is configured so that operation of a single selection key selects a corresponding corner field of the three by three matrix.

4. A device according to claim 2, wherein the controller is configured so that simultaneous operation of two selection keys selects a corresponding middle field of the three by three matrix.

5. A device according to claim 1, wherein the controller is configured for hierarchical selection of a symbol to the device.

6. A device according to claim 1, wherein selection of a symbol is performed by simultaneous release of all keys of a set of selection keys associated with a first hierarchical level disregarding a state of selection keys of another set of selection keys.

7. A device according to claim 6, wherein selection of a symbol is performed by pressing at least one of the second set of four selection keys without pressing any keys of the first set of four selection keys.

8. A device according to claim 1, wherein the first set of four selection keys are constituted by specific keys in a keyboard of a hand held device.

9. A device according to claim 1, wherein the first set of four selection keys are constituted by specific keys in a keyboard of a computer.

10. A device according to claim 1, wherein a function of the first set of four selection keys are performed by specific keys in a keyboard of a hand held device.

11. A device according to claim 1, wherein a function of the first set of four selection keys are performed by specific keys in a keyboard of a computer.

* * * * *